(12) United States Patent
Schwimley et al.

(10) Patent No.: US 8,016,246 B2
(45) Date of Patent: Sep. 13, 2011

(54) PLASMA ACTUATOR SYSTEM AND METHOD FOR USE WITH A WEAPONS BAY ON A HIGH SPEED MOBILE PLATFORM

(75) Inventors: Scott L. Schwimley, Foristell, MO (US); Donald V. Drouin, Jr., O'Fallon, IL (US)

(73) Assignee: The Boeing Company, Chicago, IL (US)

( * ) Notice: Subject to any disclaimer, the term of this patent is extended or adjusted under 35 U.S.C. 154(b) by 1039 days.

(21) Appl. No.: 11/753,869

(22) Filed: May 25, 2007

(65) Prior Publication Data
US 2008/0290218 A1   Nov. 27, 2008

(51) Int. Cl.
*B64C 21/00* (2006.01)
*B64C 23/00* (2006.01)

(52) U.S. Cl. ....................... 244/205; 244/1 N (58) Field of Classification Search .................. 244/205, 244/53 B, 1 N, 130; 415/914
See application file for complete search history.

(56) References Cited

U.S. PATENT DOCUMENTS

| | | | | |
|---|---|---|---|---|
| 4,697,764 | A * | 10/1987 | Hardy et al. | 244/137.4 |
| 6,098,925 | A * | 8/2000 | Burdsall et al. | 244/118.1 |
| 6,570,333 | B1 * | 5/2003 | Miller et al. | 315/111.21 |
| 6,739,554 | B1 * | 5/2004 | Stanek | 244/137.1 |
| 7,624,941 | B1 * | 12/2009 | Patel et al. | 244/3.22 |
| 7,637,455 | B2 * | 12/2009 | Silkey et al. | 244/53 B |
| 7,735,910 | B2 * | 6/2010 | Ramsay | 296/217 |
| 2004/0026231 | A1 * | 2/2004 | Pribyl | 204/164 |
| 2008/0023589 | A1 * | 1/2008 | Miles et al. | 244/205 |

FOREIGN PATENT DOCUMENTS

| | | |
|---|---|---|
| EP | 1619118 | 1/2006 |
| EP | 1926353 | 5/2008 |
| EP | 1936116 | 6/2008 |
| WO | WO2002/081303 | 10/2002 |
| WO | WO2007133239 | 11/2007 |

OTHER PUBLICATIONS

Santhanakrishman et al., On Plasma Synthetic Jet Actuators, Jan. 9-12, 2006, AIAA, AIAA 2006-317.*
http://en.wikipedia.org/wiki/Duty_cycle.*
http://www.merriam-webster.com/dictionary/cavity.*
Rivir et al. AC and Pulsed Plasma Flow Control, Jan. 5-8, 2004, AIAA, AIAA 2004-847.*

(Continued)

*Primary Examiner* — Joshua J Michener
(74) *Attorney, Agent, or Firm* — Harness, Dickey & Pierce, P.L.C.

(57) ABSTRACT

A system and method for controlling a freestream air flow over a surface of an airborne mobile platform, for example an aircraft. In one implementation the system includes a plurality of plasma actuators used on an undersurface of a fuselage of an aircraft upstream of a weapons bay of the aircraft. When the plasma actuators are energized an induced flow is created adjacent the actuators. The induced flow operates to deflect the shear layer created when the freestream air flow moves over the weapons bay (while the bay doors are open), away from the weapons bay. This significantly reduces the oscillating acoustic pressure waves that would normally be produced if the shear layer turns into the weapons bay. The system and method significantly reduces acoustic noise inside the weapons bay and improves separation of ordnance from the weapons bay.

13 Claims, 9 Drawing Sheets

OTHER PUBLICATIONS

Roth, J. Reece. University of Tennessee Plasma Sciences Laboratory, Final Report Grant AF F49620-01-1-0425 (Roth)—"An Investigation of Flow Acceleration and Electromagnetic Absorption Phenomena Induced by Paraelectric and Peristaltic Electrohydrodynamic Effects of the One Atmosphere Uniform Glow Discharge Plasma", dated Jun. 1, 2001 to Nov. 30, 2003, pp. 1-25.

Chan, Sammie; Zhang, Xin; arid Gabriel, Steve. "The Attenuation of Cavity Tones Using Plasma Actuators", 11th AIAA/CEAS Aeroacoustics Conference, May 23-25, 2005, AIAA 2005-2802, pp. 1-14.

Corke, T. C. et al. "Plasma Flapts and Slats: An Application of Weakly-Ionized Plasma Actuators", AIAA. Collection of Technical Papers, AIAA, US, No. Paper-AIAA-2004-2127, Jun. 28, 2004, 9 pages, XP009114869.

Mitchell, Douglas A. "Control of High Speed Cavity Flow Using Plasma Actuators", Thesis, The Ohio State University, Department of Mechanical Engineering Honors Theses, May 2006, pp. 1-63.

Moreau, Eric. "Airflow Control by Non-Thermal Plasma Actuators", Journal of Physics D. Applied Physics, IOP Publishing, Bristol, GB, vol. 40, No. 3, Feb. 7, 2007, pp. 605- 636, XP020112117.

Extended European Search Report for corresponding International Application No. 08156378.5—2422/1995172 dated Dec. 20, 2010.

* cited by examiner

PLASMA ACTUATOR SYSTEM AND METHOD FOR USE WITH A WEAPONS BAY ON A HIGH SPEED MOBILE PLATFORM

CROSS-REFERENCE TO RELATED APPLICATIONS

The present application is related in general subject matter to U.S. application Ser. No. 11/753,857 and U.S. application Ser. No. 11/753,876, both filed concurrently herewith.

The present disclosure is also related in general subject matter to U.S. application Ser. No. 11/403,252, filed Apr. 12, 2006, and assigned to The Boeing Company.

All of the above-mentioned applications are hereby incorporated by reference into the present disclosure.

FIELD

The present disclosure relates to plasma actuators, and more particularly to a system and method employing one or more plasma actuators for improving the acoustics of a weapons bay of a high speed mobile platform when a weapons bay door of the mobile platform is opened, and also improving the separation of a weapon being released from the weapons bay, by modifying the boundary layer flow over the weapons bay.

BACKGROUND

The statements in this section merely provide background information related to the present disclosure and may not constitute prior art.

To meet many modern day performance requirements, airborne mobile platforms, for example with jet powered military aircraft, often have various and highly integrated platform configurations. These configurations can include internal weapons bays, which are typically located on the belly of the fuselage of the aircraft. When a weapon stored within the weapons bay is to be released from the aircraft, typically one hingedly supported door, or a pair of hingedly supported bay doors, are opened and then the weapon is released. However, due to the high speeds at which many jet aircraft are operating at when weapons are released from the weapons bay, the shear layer air flow over the weapons bay can produce high acoustic levels and challenges in releasing weapons when the bay doors are opened. In effect, there occurs a time-dependent separation of the shear layer at the leading edge of the weapons bay that moves in to the bay, thus producing high acoustic noise and loading. Complicating this is that existing weapons are typically qualified to maximum conditions that may not be sufficient for deployment from an internal weapons bay of an aircraft. Modification or re-qualification of the weapons is typically not an option.

Traditionally, to passively counter the high acoustic levels experienced inside the weapons bay and to improve weapon separation characteristics, a flow spoiler is located on the fuselage of the aircraft externally of, and upstream of, the weapons bay. The spoiler operates to "deflect" the approaching air flow, plus "spoil" and reduce the intensity of the bay oscillating pressure waves adjacent the opening in the fuselage. This passive approach is usually limited in optimal performance to performing within a limited portion of the flight envelope (i.e., with a predetermined speed range for the aircraft). The mechanical flow spoiler typically requires mechanical linkage and electromechanical and/or hydraulic actuators, all of which can add significant weight, complexity, and life cycle costs to the air vehicle.

SUMMARY

The present disclosure is related to a system and method that employs at least one plasma actuator located on a surface of a mobile platform upstream of a cavity in the mobile platform (relative to a freestream air flow over the platform) to modify a path of an airflow adjacent the cavity. The system may be used on any form of mobile platform in connection with any form of opening, cavity, or potentially anywhere it is desired to deflect the freestream flow moving over the mobile platform. The system is expected to find particularly utility in connection with military aircraft to modify a freestream air flow to reduce oscillating acoustic pressure waves within a weapons bay of the aircraft with the weapons bay door(s) is/are opened.

In one embodiment a plasma actuator is located upstream of an upstream edge of a weapons bay on an aircraft. Energizing the plasma actuator with an electrical signal causes ionization of the air molecules in the boundary layer of a freestream air flow moving over the actuator. This also results in an electric field being developed adjacent the actuator which acts on the ionized air to create an induced flow that is directed upstream, relative to the direction of the freestream air flow. This in turn causes the freestream air flow to be deflected away from the weapons bay. The deflected freestream air flow helps to significantly reduce oscillating acoustic pressure waves that would otherwise develop from a shear layer passing over and curling into the weapons bay. The reduction in the oscillating acoustic pressure waves helps to reduce acoustic levels in the weapons bay and to improve the separation characteristics for ordnance or munitions being released from the weapons bay.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
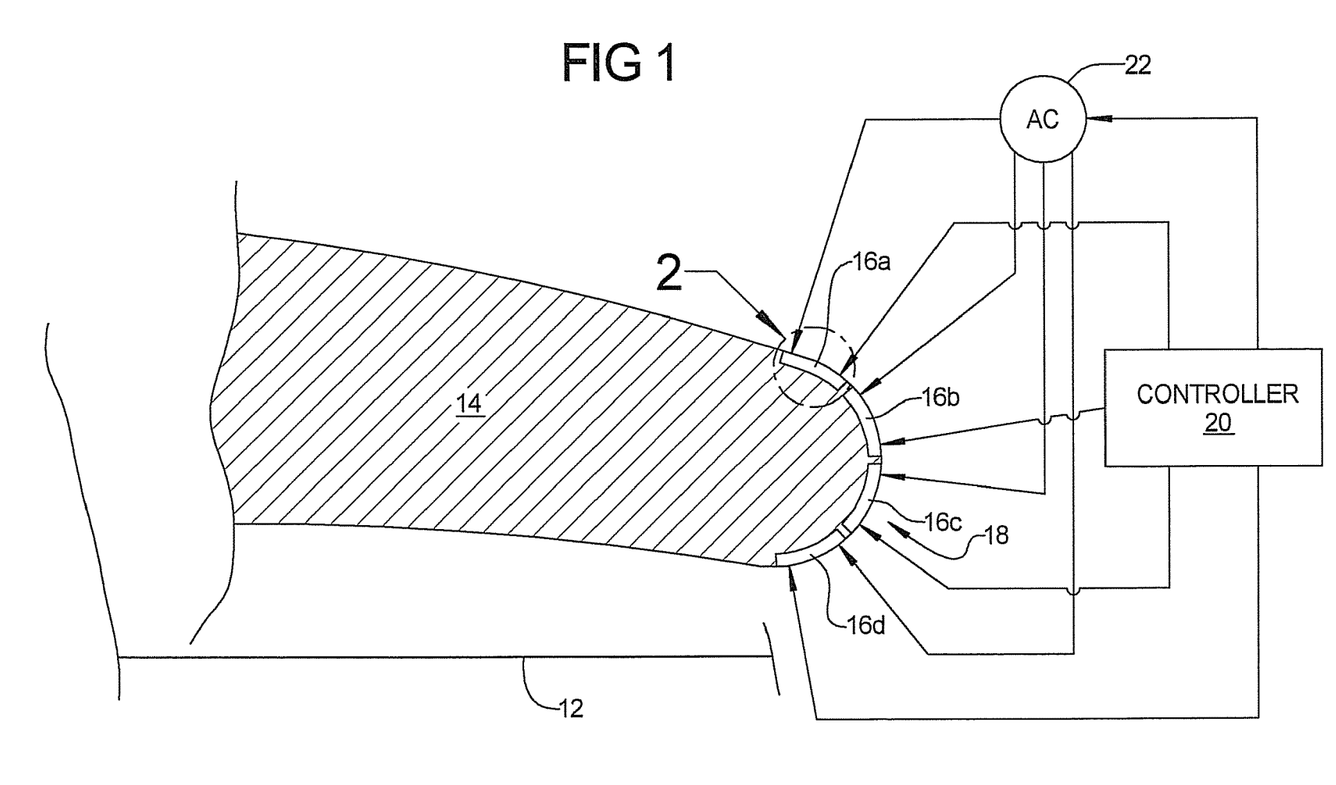
FIG. 1 is a side view of one exemplary embodiment of a flight control system being employed on a Coanda surface of a wing of an aircraft, where the system makes use of a plurality of plasma actuators that are positioned over the Coanda surface.

Referring to FIG. 1, there is shown a flow control system 10 used on a wing 14 of a mobile platform 12. In this example the mobile platform 12 is an aircraft, and for convenience will be referenced throughout the following discussion as "aircraft 12". It will be appreciated immediately, however, that the teachings of the present disclosure are not limited to use with only airborne mobile platforms employing wings, such as commercial and military aircraft, but are readily applicable to unmanned air vehicles (UAVs), missiles, rotorcraft, land vehicles and even high speed marine vessels.

Figure 1A:
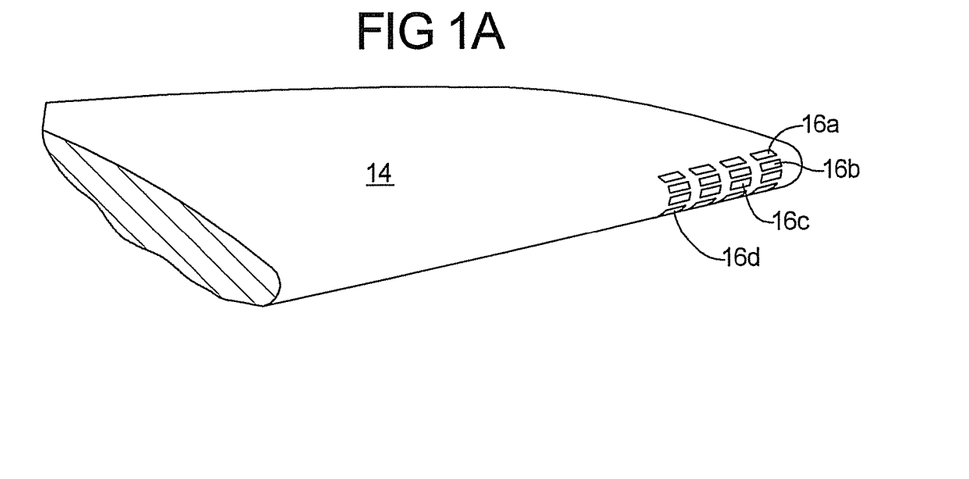
FIG. 1A shows a perspective view of a portion of the wing of FIG. 1 employing a plurality of spaced apart rows of the plasma actuators shown in FIG. 1.

In FIG. 1 the system 10 employs a plurality of plasma actuators 16 that are spaced apart along a Coanda surface 18 of the wing 14. While only four plasma actuators 16 are shown, a greater or lesser plurality could be employed to meet the needs of a specific application. In this example, two plasma actuators 16a, 16b are provided on a top half portion of the Coanda surface 18 while two additional plasma actuators 16c, 16d are provided on a bottom half portion of the Coanda surface. It will be appreciated that the Coanda surface 18 need not be associated with an aircraft wing, but instead could be associated with any component, for example a rear spoiler of a land vehicle. If the plasma actuators are incorporated on a vertical tail of an aircraft or other form of mobile platform, then it will be appreciated that the references to "top half" and "bottom half" may instead be termed "port side half" and "starboard side half". Also, in practice, it is anticipated that many applications may require a plurality of each of the actuators 16a, 16b, 16c and 16d to be spaced apart in a span-wise direction along the wing 14 or other form of aerodynamic surface. An example of this arrangement is illustrated in FIG. 1A. The precise placement of the plasma actuators 16 may be varied as needed to meet a specific application. Fox example, arrangements of the plasma actuators 16 are also possible where the actuators are arranged with their long axes cord-wise, with many of the actuators arrayed along a wingspan to facilitate separation control with coherent vorticity.

A controller 20 and a high voltage alternating current (AC) voltage source 22 are in communication with each plasma actuator 16. The controller 22 independently controls the application of a high voltage signal, preferably between about 3,000 VAC up to about 20,000 VAC, or possibly even higher, to each plasma actuator 16. Energizing any one of the plasma actuators 16 causes the actuator to ionize air in its vicinity adjacent the outer surface portion 18a of the Coanda surface 18. An electric field is also created that is directly proportional to the magnitude of the AC voltage being applied. The electric field acts on the ionized air to create an induced flow over the energized plasma actuator 16 that tends to draw the boundary layer toward the Coanda surface 18 as it moves over the Coanda surface. This helps to delay separation of the boundary layer from the Coanda surface 18.

Figure 2:
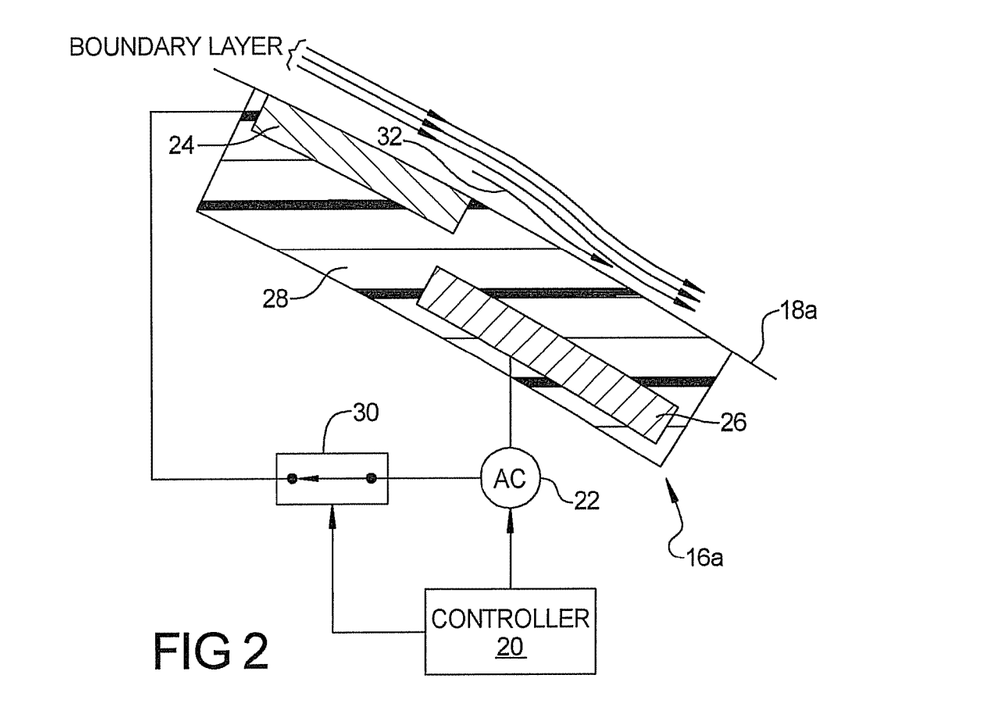
FIG. 2 is an enlarged side view of one of the plasma actuators shown in FIG. 1.

Referring to FIG. 2, one of the plasma actuators 16a is shown in greater detail. This form of actuator is also discussed in co-pending U.S. application Ser. No. 11/403,252, filed Apr. 12, 2006, and assigned to The Boeing Company, which has been incorporated herein by reference. In brief, however, the plasma actuator 16a includes a first electrode 24 and a second electrode 26 separated by a dielectric material 28. The dielectric material 28 may form a distinct layer that is disposed between the electrodes 24 and 26, as shown in FIG. 2. Preferably the electrodes 24 and 26 are recess mounted in the outer surface 18a of the Coanda surface 18 so as not to interfere with its smooth surface contour. However, mounting of at least the first electrode 24 directly on the Coanda surface is also possible. If mounted directly on the Coanda surface 18, then the first electrode 24 would typically not be completely encapsulated by the dielectric material 28. The plasma actuators 16 are further each arranged on the Coanda surface 18 such that the second electrode 26 is positioned downstream, relative to the direction of the boundary layer flow, of the first electrode 24.

The AC voltage source 22 is coupled between the controller 20 and the second electrode 26. A switch 30 is interposed between the AC voltage source 22 and the first electrode 24. The switch 30 may be a semiconductor switch, or it may be an electromechanical switch that is actuated by a suitable electrical signal. Essentially any form of switch may be used that meets the needs of a specific application.

When the controller 20 closes the switch 30, the high voltage AC signal applied across the electrodes 24 and 26 (typically at least about 3,000 VAC) causes air in the vicinity of the electrodes 24 and 26, and closely adjacent the outer surface 18a of the Coanda surface 18, to be ionized. An electric field is also created between the electrodes 24 and 26. The electric field acts on the ionized air to induce a flow 32 closely adjacent the outer surface 18a that moves from the first electrode 24, over the outer surface 18a, and over the second electrode 26. The induced flow 32 serves to draw the boundary layer flow down against the outer surface 18a, which helps to delay the onset of boundary layer separation from the Coanda surface 18.

The particulars of the construction of the electrodes 24 and 26 may vary considerably to meet the needs of a particular application. The electrodes 24 and 26 may be formed from any conductive material. Copper is one material that is particularly suitable. The electrodes 24 and 26 may be formed as thin strips, possibly as foil strips, and may have a typical thickness on the order of about 0.001-0.005 inch (0.0254-0.127 mm). The length and width of each electrode 24 and 26 may vary as needed to suit specific applications, but it is anticipated that in many aircraft applications, the dimensions of each electrode may typically be on the order of 1-20 inches (2.54 cm-50.08 cm) for the length and 0.12-0.20 inch (3-5 mm) for the width. The dielectric material 28 may comprise any suitable dielectric material, for example quartz, KAPTON®, or TEFLON® dielectric material. Other dielectric materials may also be suitable for use, and the precise dielectric material used may be dictated by the needs of a specific application. Preferably, the dielectric material 28 provides a thickness layer of about 0.005-1.0 inch (0.127-25.4 mm) between the first and second electrodes 24 and 26, respectively.

Figure 3:
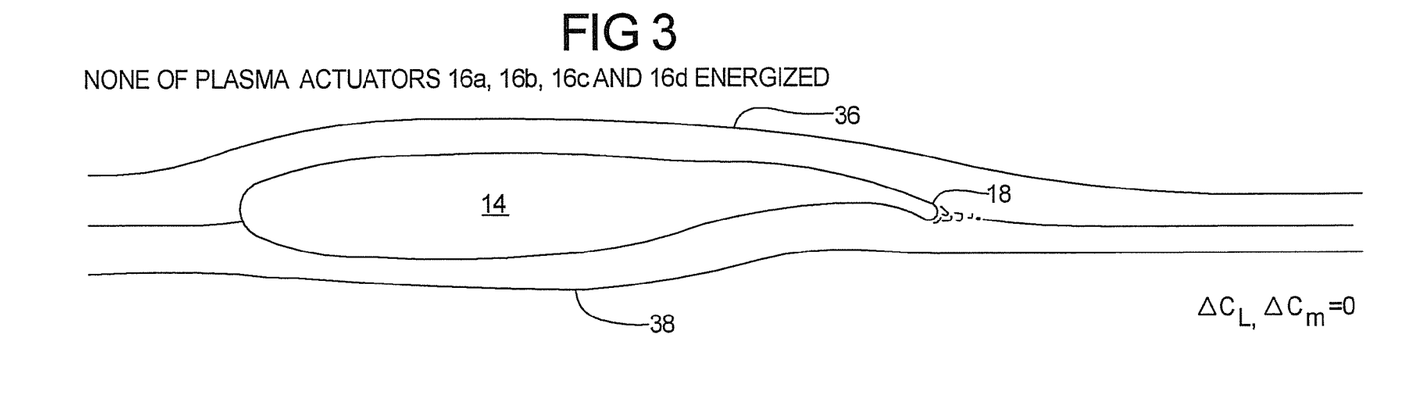
FIG. 3 is a side view of the wing of FIG. 1 illustrating how the boundary layer flow appears with none of the plasma actuators actuated.

Referring now to FIGS. 3-6, the influence on the boundary layer flow that is provided by selectively energizing various ones of the plasma actuators 16 will be described. Referring first to FIG. 3, the upper and lower surface streamlines 36 and 38 are shown moving over the Coanda surface 18 while none of the plasma actuators 16 (not visible) are energized. In this Figure the incremental lift coefficient induced by the system 10 ($\Delta C_L$) equals the incremental pitching moment coefficient induced by the system ($\Delta C_M$), and both are zero.

Figure 4:
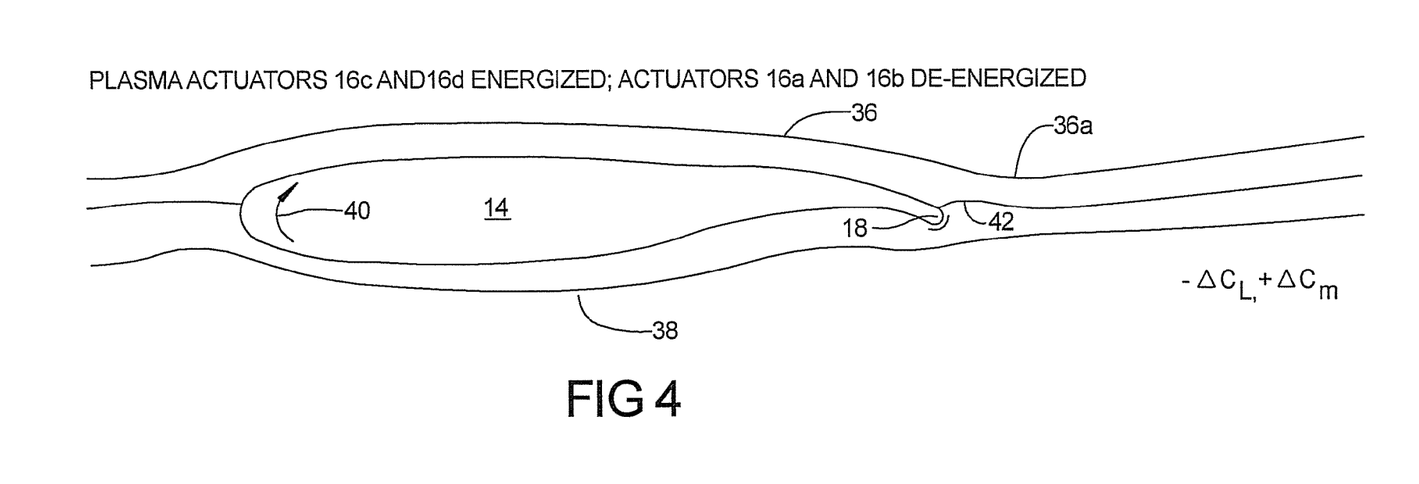
FIG. 4 shows the wing of FIG. 1 but with at least one of the plasma actuators on only the lower surface being energized, with the resulting change in the boundary layer flow along the Coanda surface and associated modification of circulation and streamlines about the wing section (i.e., causing the wake flow to be deflected upwardly)

In FIG. 4 plasma actuators 16c and 16d on the lower half of the Coanda surface 18 have been energized, while actuators 16a and 16b on the upper half are de-energized. This creates a negative lift coefficient ($-\Delta C_L$) and a positive pitching moment ($+\Delta C_M$) directed in accordance with arrow 40. Streamline 42 indicates how actuators 16c and 16d have modified the boundary layer flow slightly to alter its separation from the Coanda surface 18. Note the portion 36a of streamline 36 is slightly more elevated than what appears in FIG. 3.

Figure 5:
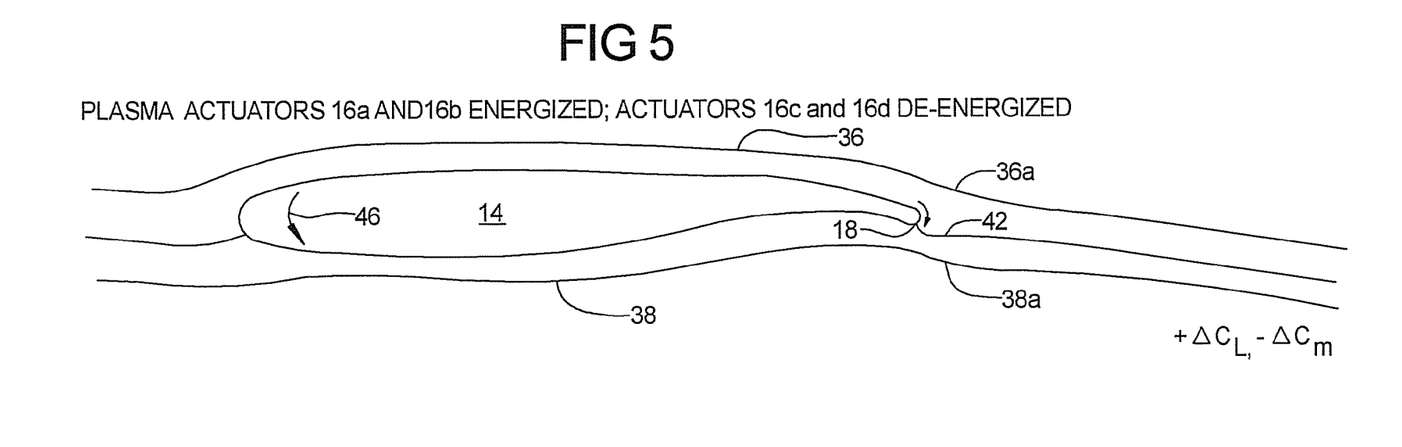
FIG. 5 shows the wing of FIG. 1 but with at least one plasma actuator on only the upper surface being energized, with the resulting change in the boundary layer flow along the Coanda surface and associated modification of circulation and streamlines about the wing section (i.e., causing the wake flow to be deflected downwardly)

Referring to FIG. 5, the plasma actuators 16a and 16b are energized while actuators 16c and 16d are de-energized. This creates a positive lift coefficient ($+\Delta C_L$) and a negative pitching moment ($-\Delta C_M$) (denoted by streamline arrow 46). The streamline 42 indicates that the plasma actuators 16a and 16b have delayed the onset of boundary layer separation, and streamlines 36a and 38a have been modified to be directed downwardly slightly.

Figure 6:
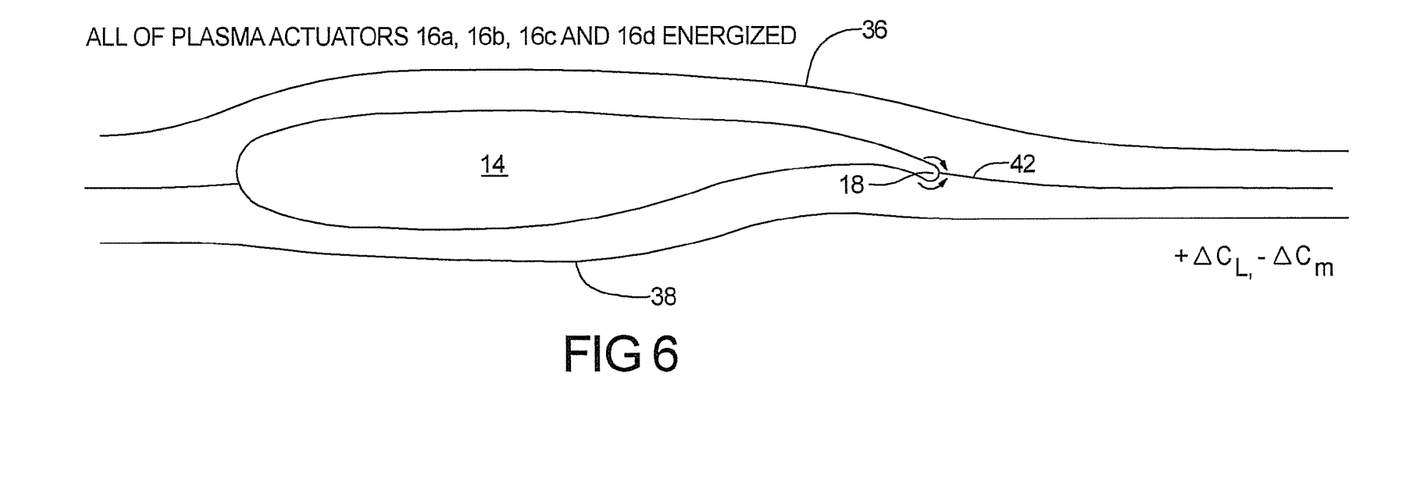
FIG. 6 is a view of the wing of FIG. 1 showing the boundary layer flow leaving the wing when at least one actuator on both of the upper surface and the lower surface is actuated (i.e., no significant change to the wake flow)

FIG. 6 illustrates the flow effect with all of the plasma actuators 16 energized. In this example the wake separation is reduced, thus reducing the drag on the wing 14 but without altering the pitching moment or lift.

Applications of the system 10 are numerous, including commercial and military aircraft, unmanned air vehicles (UAVs) and missiles. Benefits will also be realized on various aerodynamic surfaces of motor land vehicles such as cars and trucks.

The system 10 provides hingeless yaw control for tailless aircraft by generating asymmetric drag. Asymmetric drag is created by controlling separation in the circulation control airfoil wake or inducing spanwise alteration between positive and negative circulation increments that produce increased induced drag without accompanying lift or pitching moment change.

The system 10 enables hingeless aerodynamic control to increase aerodynamic and structural efficiency. Aerodynamic efficiency is improved by elimination of elevon edge and hingeline gaps on wings and like aerodynamic surfaces. Structural efficiency is improved by increasing torque box size which decreases weight, eliminates mechanical actuation weight and complexity, and increases wing internal volume for fuel, etc.

The system 10 can simplify high-lift systems for aircraft (especially commercial transports with highly complex multi-element flaps) to increase low-speed performance while reducing cost, weight and complexity. The system 10 can potentially be used to replace trim tabs on commercial aircraft rudders or elevators, eliminating mechanical complexity of a secondary moving surface on the primary control surface. Use of the system 10 may produce higher control rates (high bandwidth controller) than conventional moving surface effectors since the system 10 is constrained only by the convective speed of the freestream fluid flow and not the mechanical motion of the flap effector. This enables control of more highly unstable airframes, increasing agility and performance. The system 10 described herein enables low-cost, reduced-complexity wing designs, which are especially useful for thin, deployable wings (missiles or small UAVs) where control surfaces are difficult to integrate using conventional approaches because of control actuation installation difficulty. Other applications are possible on non-flying vehicles, such as semi-trailer aero-braking assist by deactivating actuation meant to reduce trailer base drag, or traction control by inducing a downward force when a Coanda surface is installed along a trailer base perimeter.

The system 10 is also expected to Increase mission flight time or range as a result of providing a more efficient means (structurally and aerodynamically speaking) to control an airborne mobile platform. Additional design flexibility is also enabled by new mechanizations of control devices, especially for tailless aircraft or air vehicles with deployable aero-surfaces. Increased control actuation rates may also be realized together with reduced overall complexity.

Figure 7:
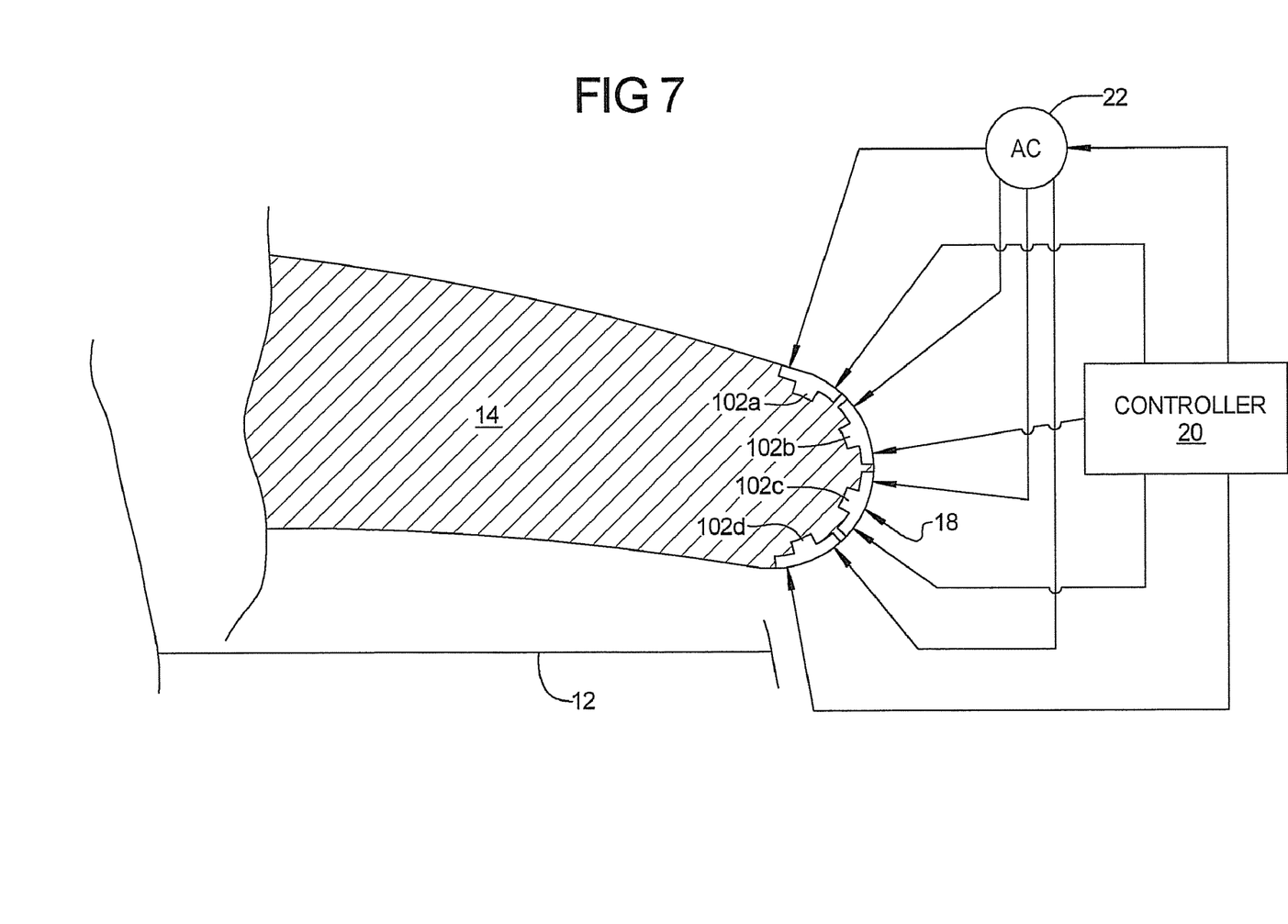
FIG. 7 illustrates how a plurality of dual mode plasma actuators may be employed on a Coanda surface.

Referring to FIG. 7, another system 100 of the present disclosure is illustrated that makes use of a plurality of dual mode plasma actuators 102 integrated into the Coanda surface 18 of the wing 14. This system 100 is identical to the system 10 of FIGS. 1 and 1A with the exception of the use of dual mode actuators 102. The dual mode plasma actuators 102 are discussed in detail in co-pending application Ser. No. 11/753,876, which has been incorporated by reference into the present application. In this example a pair of the dual mode plasma actuators 102a and 102b is disposed on the upper half of the Coanda surface 18 of the wing 14. A second pair of actuators 102c and 102d is disposed on the lower half. As with the system 10 described in connection with FIG. 1, a plurality of the dual mode plasma actuators 102 may be spaced apart, span-wise, along the Coanda surface 18. The precise number, spacing and arrangement of the dual mode plasma actuators 102 employed will vary to meet the needs of a specific application.

Figure 8:
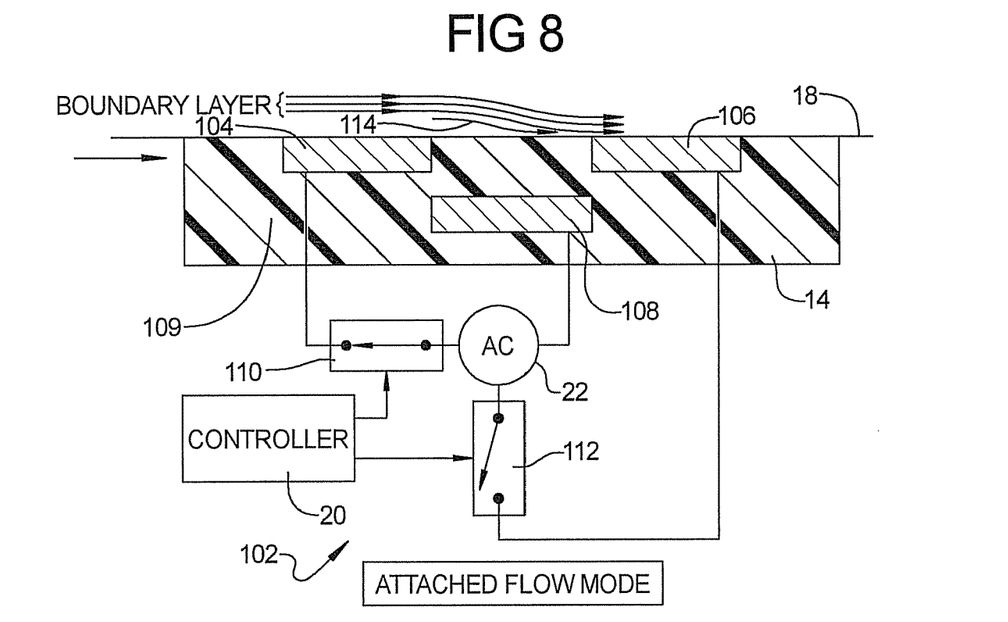
FIG. 8 illustrates in greater detail one of the dual mode plasma actuators circled in FIG. 7, with its first and third electrodes connected across the AC voltage source to induce a flow that helps to delay boundary layer separation.
Figure 9:
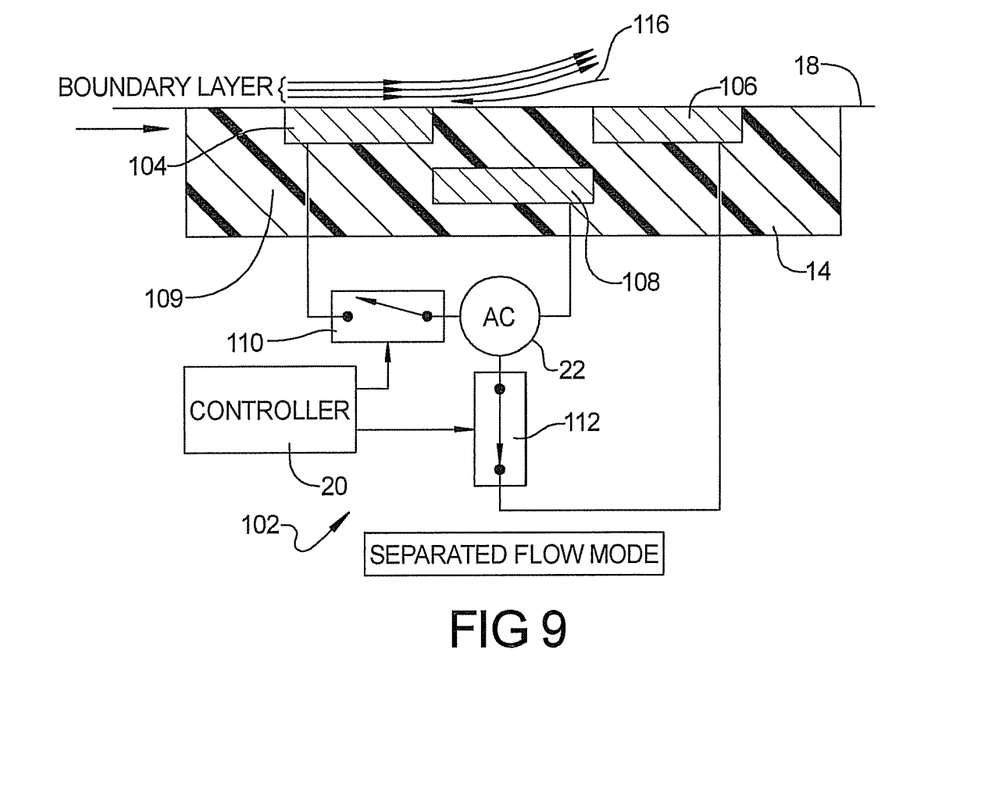
FIG. 9 illustrates the dual mode plasma actuator of FIG. 8 but with the second and third electrodes connected across the AC voltage source to induce a flow that serves to promote boundary layer flow in the opposite direction.

Referring to FIGS. 8 and 9, the dual mode plasma actuators 102 are similar to the plasma actuators 16, but include three electrodes 104, 106 and 108 rather than two electrodes. Two switches 110 and 112 enable the AC voltage source 26 to be applied across either the first and second electrode pair 104 and 108, or between the second and third electrode pair 106 and 108. The third electrode 108 is separated by a suitable dielectric material layer 109, or encased in a suitable dielectric material.

When the AC voltage from the AC voltage source 26 is applied across electrode pair 104 and 108 by closing switch 110 and opening switch 112, the plasma actuator 102 operates in the same manner as described for actuator 16; that is, an induced fluid flow 114 is created (FIG. 8). The direction of the induced flow 114 is the same as that of the boundary layer flow flowing over the actuator 102. As with plasma actuator 16, the induced fluid flow 114 acts on the boundary layer flow to help prevent separation of the boundary layer flow from the Coanda surface 18. However, when electrode pair 106 and 108 is energized by closing switch 112 and opening switch 110, an induced flow 116 is created that is in the direction opposite to that of induced flow 114 (FIG. 9). In this instance the induced flow 116 helps to promote attachment of the boundary layer further around the trailing edge of the Coanda surface 18 when operated in concert with the plasma actuator on the other half of the Coanda surface.

The system 100 provides an added degree of flow control flexibility because various ones of the plasma actuators 102 can have different pairs of electrodes 104,106,108 energized to even more significantly affect the boundary layer flow (i.e., either more significantly promote attachment or separation of the boundary layer flow). For example, certain of the plasma actuators 102, for example those located on the top half of the Coanda surface 18, can be energized to create the induced flow 114 (to promote boundary layer attachment), while other ones of the actuators 102 located on the bottom half of the Coanda surface 18 can be energized to produce induced flow 116 (to enhance the turning of the flow around the Coanda surface 18). The overall result in this specific example is that all of the plasma actuators 102 would be working to even more significantly move the trailing edge stagnation point around the Coanda surface 18. The controller 20 may control the energization of specific electrode pairs 104,108 or 106, 108 of the plasma actuators 102 as needed so that it produces a nose-up or nose-down moment on the surface where the system 100 is employed.

Thus, the system 100 provides an even further enhanced range of aerodynamic flow control possibilities. It should also be appreciated that various combinations of plasma actuators 16 and 102 could be used on a surface, for example Coanda surface 18, to even further enhance control over the separation and/or attachment of the boundary layer.

Figure 10:
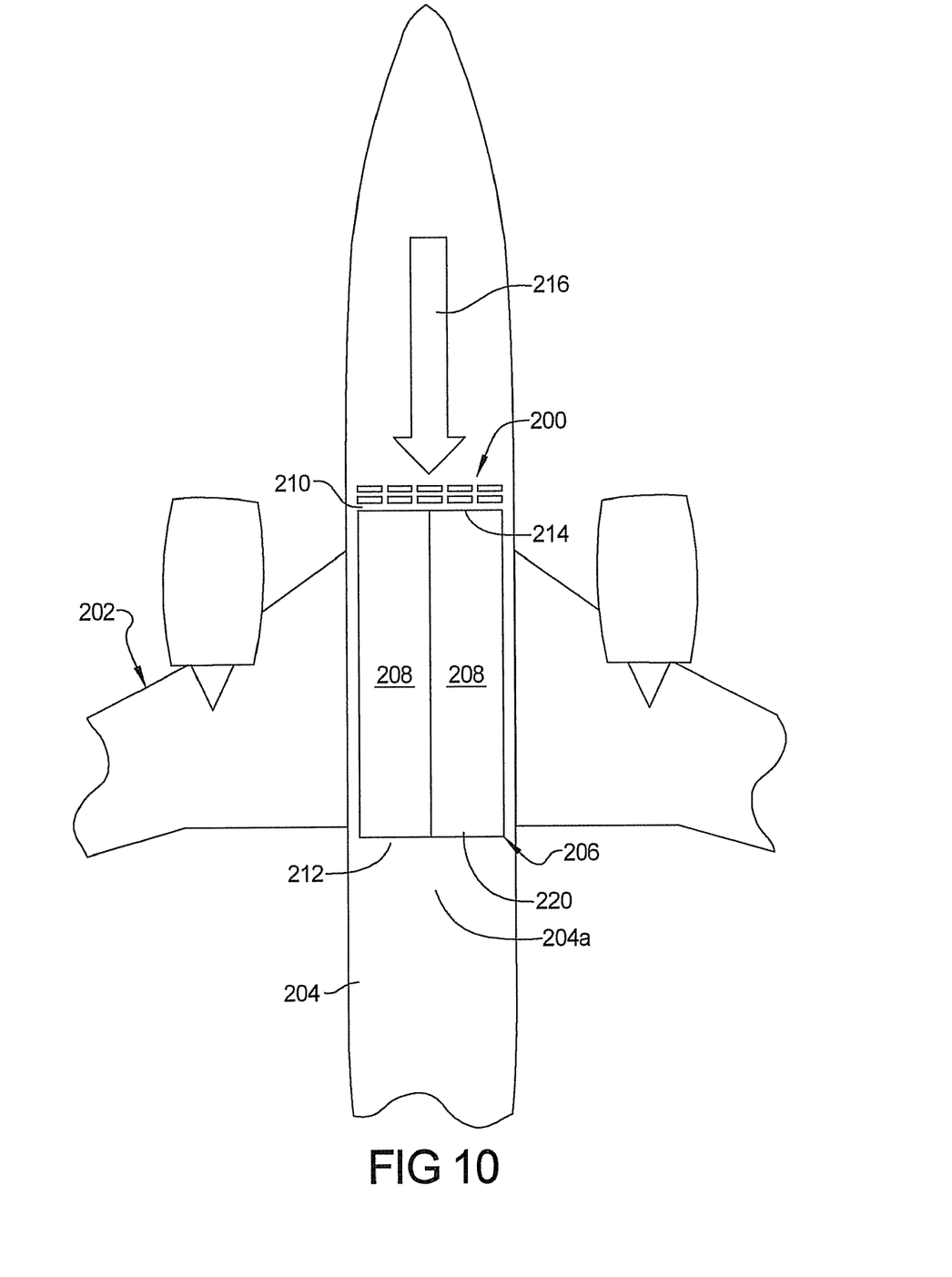
FIG. 10 is a plan view of an undersurface of a mobile platform, in this example an aircraft, illustrating another flow control system of the present disclosure for use in deflecting a shear layer away from a weapons bay of the aircraft.
Figure 11:
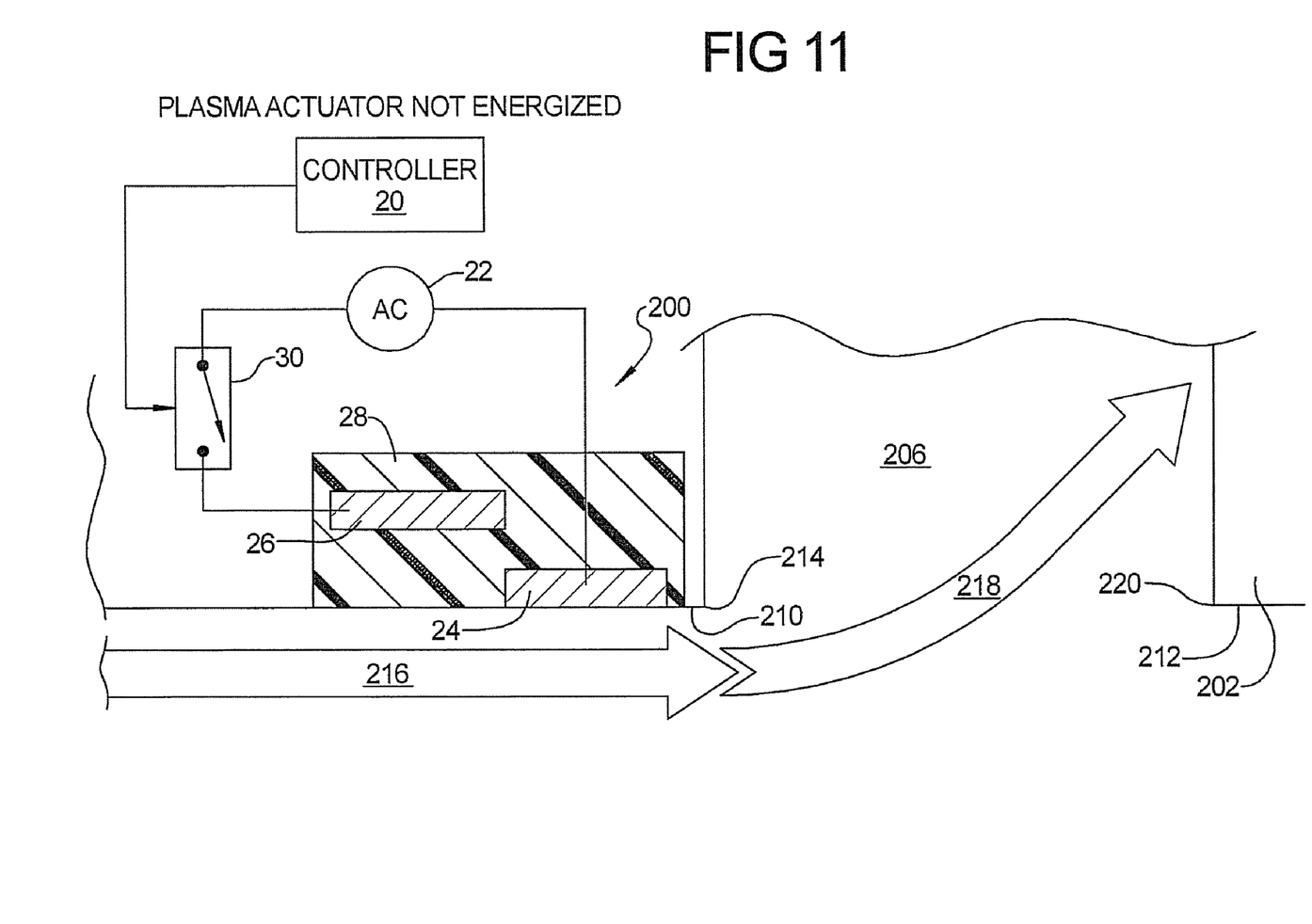
FIG. 11 is a side view of a portion of the fuselage of the aircraft of FIG. 10 illustrating a path of airflow over the weapons bay when the weapons bay doors are opened.
Figure 12:
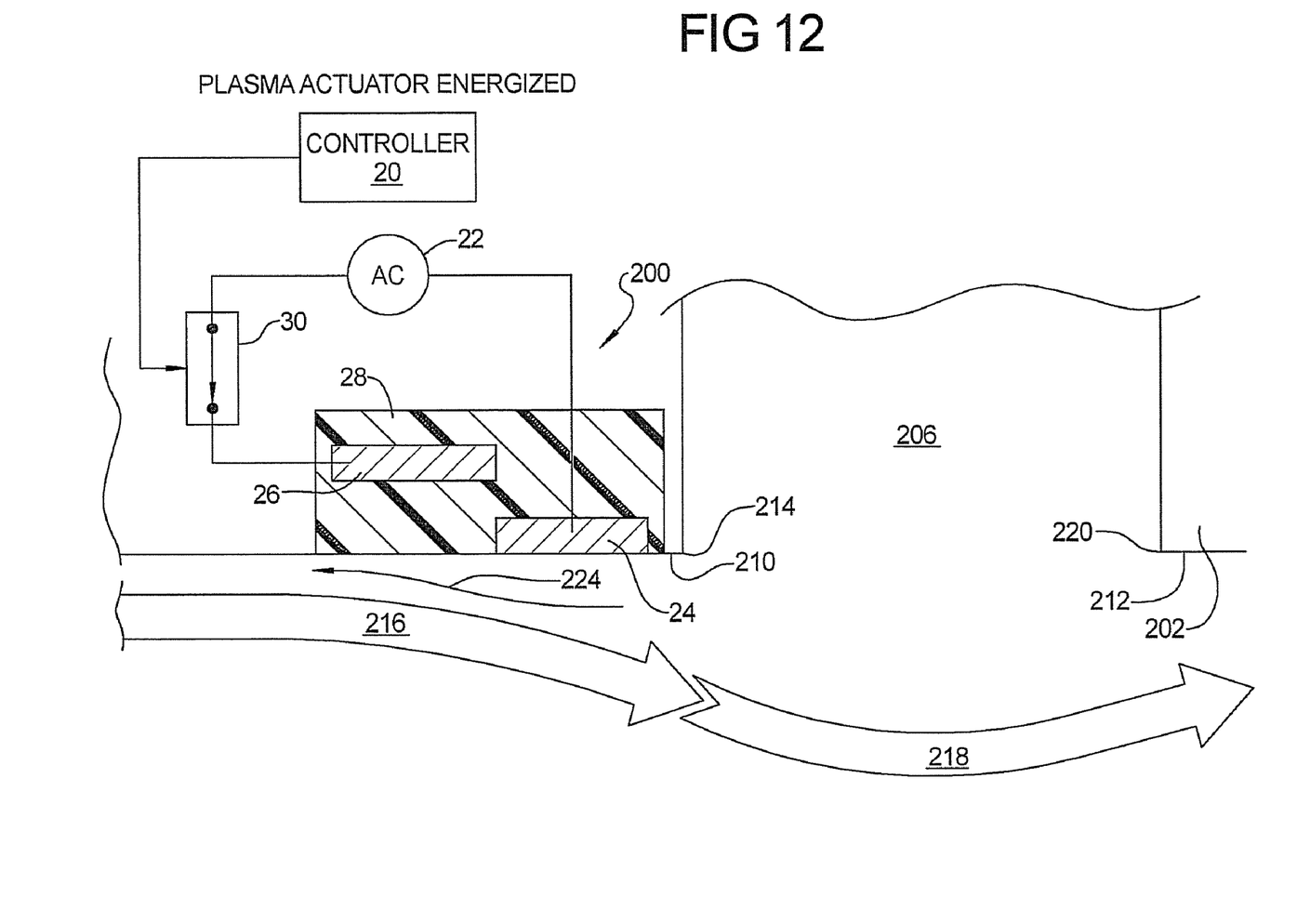
FIG. 12 is a side view of the aircraft of FIG. 11 illustrating how the plasma actuators operate to deflect the shear layer away from the weapons bay when the bay doors are opened.

Referring to FIGS. 10-12, another system 200 of the present disclosure is shown. The system 200 enables the shear layer passing over a cavity of a mobile platform, for example an aircraft, to be deflected away from the cavity. This significantly reduces acoustic pressure levels within the cavity. When the cavity is a weapons bay on an airborne mobile platform, the system also significantly improves weapons separation from the mobile platform.

Referring specifically to FIG. 10, in this example the mobile platform is an aircraft 202 having a fuselage 204. At an undersurface 204a of the fuselage 204 a weapons bay 206 is provided. The weapons bay 206 may be covered by one or more moveable doors 208, and in this example a pair of doors 208 is shown. A portion immediately upstream and adjacent the weapons bay 206 is defined by reference numeral 210 and a portion immediately downstream of the weapons bay is denoted by reference numeral 212. It will be understood that the terms "upstream" and "downstream" are used in relation to the direction of a freestream air flow 216 over the fuselage 204.

Referring to FIGS. 10 and 11, the system 200 employs at least one of the plasma actuators 16, and more preferably a plurality of the plasma actuators 16, positioned on the undersurface 204a of the fuselage 204 along the upstream portion 210. The plasma actuators 16 are preferably recess mounted in the fuselage 204 to maintain the smooth aerodynamic surface of the fuselage 204. The plasma actuators 16 in this example are arranged with their long axes generally parallel to an upstream edge 214 of the weapons bay 206. However, the plasma actuators 16 may be arranged in different orientations as dictated by the aerodynamics of a specific mobile platform or the needs of a particular application. Importantly, the plasma actuators 16 are arranged 180 degrees from the orientation shown in FIG. 2, relative to the freestream air flow 216 passing over them. That is, they are arranged with the second electrode 26 disposed upstream of the first electrode 24. Two or more rows of the plasma actuators 16 may be incorporated, as indicated in FIG. 10.

With further reference to FIG. 11, the aircraft 202 is illustrated along with a path of a shear layer 218 that develops as the freestream air flow 216 moves over the weapons bay 206 when the bay doors 208 are opened. To avoid cluttering the Figure, the weapons bay doors 208 have not been shown in FIG. 11.

It will be appreciated that the shear layer 218 is generally the interface between the quiescent air in the weapons bay 206 and the bulk freestream air flow 216. The air in the weapons bay 206 does not necessarily need to be quiescent in order for a shear layer to be generated. Depending on the bulk freestream air flow 216 properties (speed, etc.), the shear layer 218 may turn into the weapons bay 206 or may impinge on the fuselage 202 downstream of an aft end 220 of the weapons bay 206. In both cases, the shear layer 218 creates oscillating acoustic pressure waves within the weapons bay 206 that in turn cause significant acoustic noise in the weapons bay. The oscillating waves and shear flow angularity may also interfere with separation of ordnance or guided munitions that are being released from the weapons bay 206. In order to reduce acoustic noise (and improve weapons separation characteristics) the impingement point of the shear layer 218 needs to be controlled.

Referring to FIG. 12, when the plasma actuators 16 are energized the air molecules in boundary layer 222 flowing over the actuators are ionized. At the same time an electric field is developed in the vicinity of the electrodes 24 and 26 that acts on the ionized air to induce a flow 224 that is directed upstream (i.e., into boundary layer flow 222). This induced flow 224 effectively acts like a mechanical spoiler to cause separation of the boundary layer 222 at, or just before, the upstream edge 214 of the weapons bay 206. This in turn helps to deflect the shear layer 218 away from the weapons bay 206 as the shear layer moves over the weapons bay. This operates to "spoil" and significantly reduce the intensity of the oscillating acoustic pressure waves within the weapons bay 206, which in turn reduces acoustic levels within the weapons bay. The reduced oscillating acoustic pressure waves help to improve separation of ordnance and/or guided munitions from the weapons bay 206.

The performance of the system 200 may further be improved by controlling the duty cycle of a pulsed AC voltage signal from AC voltage source 22 to the actuators 16. Power efficiency of the system 200 may be improved as well. Controlling the duty cycle of a pulsed AC voltage signal applied to the plasma actuators 16 can enable the system 200 to function in a manner similar to previously developed active flow control (AFC) devices that typically use sucking/blowing surface mounted air jet ports. Thus, tailoring of the flow in the vicinity of the weapons bay 206 can be achieved across a larger flight envelope and, for certain weapons and ejection systems, with significantly less complexity and weight as compared to traditional spoilers or other AFC devices. This may also result in improved life cycle costs compared to what would typically be experienced with conventional mechanical spoiler and AFC systems.

Whether using a pulsed system as described immediately above, or an analog control system that simply varies the AC output signal from the AC voltage source 22 as needed, the AC voltage output signal may be controlled to vary the amount deflection of the freestream air flow 216. The amount of deflection induced could also be used to control the point at which the freestream flow 216 reattaches to the fuselage 204.

While the system 200 has been described as being employed to modify a separation layer adjacent a weapons bay, it will be appreciated that the system 200 is readily applicable to controlling the freestream flow adjacent any form of cavity or opening on a mobile platform. Essentially, the system 200 is potentially usable in any application where a mechanical spoiler or conventional AFC system would be desirable. While the system 200 may be especially valuable in aircraft and aerospace applications, the system 200 can be used with any mobile platform, for example a rotorcraft, unmanned air vehicle, high speed land vehicles or even high speed marine vessels. Essentially, the system 200 may have application in connection with any form of vehicle where there is a need to control the freestream flow adjacent an opening, cavity or other component on the vehicle.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for controlling an air flow over a cavity in a body of an airborne mobile vehicle to reduce an intensity of oscillating pressure waves in a vicinity of said cavity, the method comprising:
   providing said cavity within a fuselage of the airborne mobile vehicle;
   disposing at least one plasma actuator on a surface of said airborne mobile vehicle upstream, relative to a direction of airflow over said airborne mobile vehicle, of said cavity but adjacent to an edge of said cavity, the plasma actuator including a pair of electrodes contained within a dielectric material and arranged such that a first one of the pair of electrodes has an exposed electrode surface and a second one of the pair of electrodes is fully encapsulated within the dielectric material, the pair of electrodes operating to generate an induced air flow, when energized, that is directed along a path parallel to and opposite of a freestream flow of air over the surface of the airborne mobile vehicle while the airborne mobile vehicle is in flight; and
   applying an electrical signal including an alternating current voltage signal to said plasma actuator to energize said plasma actuator and cause ionization of air adjacent said plasma actuator, and the generation of the induced flow in a direction that opposes the freestream flow of air, to thus deflect a shear layer away from said cavity.

2. The method of claim 1, further comprising disposing a plurality of said plasma actuators adjacent an upstream edge of said cavity such that said plasma actuators generate additional induced flows directed in a direction longitudinally opposite to the freestream flow of air, and applying said electrical signal to each of said plasma actuators.

3. The method of claim 1, wherein applying an electrical signal to said plasma actuator comprises using a controller to control a switch operably associated with said plasma actuator to apply said electrical signal to said plasma actuator.

4. The method of claim 3, wherein using said controller to control a switch comprises using said controller to intermittently control said switch so that a variable duty cycle AC electrical signal is applied to said plasma actuator.

5. The method of claim 1, wherein applying an electrical signal to said plasma actuator comprises applying an alternating current (AC) signal having a voltage of at least about 3,000 volts to said plasma actuator.

6. The method of claim 1, wherein applying an electrical signal to said plasma actuator comprises applying an AC voltage of between about 3,000-20,000 volts to said plasma actuator.

7. The method of claim 1, further comprising arranging the pair of electrodes within the dielectric material so that the first and second electrodes of the pair of electrodes are elevationally staggered, relative to the surface of the fuselage of the airborne mobile vehicle.

8. A method for altering a flow path of an air flow over a weapons bay of an airborne mobile vehicle, comprising:
   disposing at least one plasma actuator on a surface of said airborne mobile vehicle upstream, relative to a direction of air flow over said airborne mobile vehicle, of said weapons bay, and adjacent an edge of said weapons bay, said plasma actuator having a pair of electrodes positioned within a dielectric material to generate an induced flow of air in a direction longitudinally opposite to a freestream flow of air moving over said surface of the airborne mobile vehicle, a first one of the pair of electrodes having an exposed surface that is not covered by the dielectric material, and a second one of the pair of electrodes being completely encapsulated within the dielectric material; and
   applying an electrical signal to said plasma actuator to energize said plasma actuator and cause ionization of air adjacent said plasma actuator, to thus generate said induced flow, said induced flow causing separation of said freestream flow of air on said surface adjacent said plasma actuator, said separation operating to deflect a shear flow away from said weapons bay when a door of said weapons bay is opened.

9. The method of claim 8, further comprising disposing a plurality of plasma actuators upstream of said weapons bay and actuating said plurality of plasma actuators.

10. The method of claim 8, wherein said applying an alternating current (AC) voltage signal comprises applying an AC voltage signal having a voltage of at least about 3,000 volts to said plasma actuator.

11. The method of claim 8, wherein said applying an AC voltage signal to said plasma actuator comprises using a controller to control a switch operably associated with said plasma actuator to apply said AC voltage signal to said plasma actuator.

12. The method of claim 11, wherein using said controller to control a switch comprises using said controller to intermittently control said switch so that a variable duty cycle electrical signal is applied to said plasma actuator.

13. The method of claim 8, wherein said plasma actuator is oriented generally parallel to an upstream edge of a weapons bay opening in a body portion of said airborne mobile vehicle.

* * * * *